United States Patent
Park et al.

(10) Patent No.: US 10,329,415 B2
(45) Date of Patent: Jun. 25, 2019

(54) THERMOPLASTIC RESIN COMPOSITION WITH IMPROVED HEAT RESISTANCE AND COLORING PROPERTY

(71) Applicant: LOTTE ADVANCED MATERIALS CO., LTD., Yeosu-si (KR)

(72) Inventors: Ji Eun Park, Uiwang-si (KR); Young Hyo Kim, Uiwang-si (KR); Kang Yeol Park, Uiwang-si (KR); Ja Yoon Kim, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

(21) Appl. No.: 15/129,498

(22) PCT Filed: Jul. 31, 2014

(86) PCT No.: PCT/KR2014/007055
§ 371 (c)(1),
(2) Date: Sep. 27, 2016

(87) PCT Pub. No.: WO2015/152468
PCT Pub. Date: Oct. 8, 2015

(65) Prior Publication Data
US 2017/0121519 A1    May 4, 2017

(30) Foreign Application Priority Data

Apr. 1, 2014 (KR) .................. 10-2014-0038577

(51) Int. Cl.
| C08L 25/12 | (2006.01) |
| C08L 33/04 | (2006.01) |
| C08L 33/12 | (2006.01) |
| C08L 33/20 | (2006.01) |
| C08L 51/00 | (2006.01) |
| C08L 51/04 | (2006.01) |

(52) U.S. Cl.
CPC ............. C08L 51/003 (2013.01); C08L 25/12 (2013.01); C08L 33/04 (2013.01); C08L 33/12 (2013.01); C08L 33/20 (2013.01); C08L 51/04 (2013.01); C08L 2205/025 (2013.01); C08L 2205/035 (2013.01); C08L 2207/53 (2013.01)

(58) Field of Classification Search
CPC .... C08L 51/003; C08L 2207/53; C08L 25/12; C08L 33/12; C08L 2205/03
See application file for complete search history.

(56) References Cited

U.S. PATENT DOCUMENTS

| 2006/0252883 A1* | 11/2006 | Berzinis ............... C08F 285/00 525/71 |
| 2007/0129470 A1* | 6/2007 | Kuvshinnikova ..... C08F 265/04 524/88 |
| 2013/0310502 A1* | 11/2013 | Naito ....................... C08K 3/32 524/417 |

FOREIGN PATENT DOCUMENTS

| CN | 102906184 A | 1/2013 |
| KR | 10-2000-0055258 A | 9/2000 |
| KR | 10-2007-0073230 A | 7/2007 |
| KR | 10-2007-0092884 A | 9/2007 |
| KR | 10-2009-0073702 A | 7/2009 |
| KR | 10-2009-0110129 A | 10/2009 |
| KR | 10-2013-0057795 A | 6/2013 |
| KR | 10-2013-0075812 A | 7/2013 |
| WO | 2015/152468 A1 | 10/2015 |

OTHER PUBLICATIONS

International Search Report in counterpart International Application No. PCT/KR2014/007055 dated Dec. 22, 2014, pp. 1-4.
Office Action in counterpart German Application No. 112014006553.6 dated Mar. 15, 2018, pp. 1-5.
Office Action in counterpart Chinese Application No. 201480077703.2 dated May 25, 2018, pp. 1-6.
English-translation of Office Action in counterpart Chinese Application No. 201480077703.2 dated May 25, 2018, pp. 1-7.

* cited by examiner

*Primary Examiner* — Jeffrey C Mullis
(74) *Attorney, Agent, or Firm* — Additon, Higgins & Pendleton, P.A.

(57) ABSTRACT

The present invention relates to a thermoplastic resin composition and, more specifically, to an acrylic resin composition having improved coloring property and heat resistance by comprising an acrylic graft copolymer, an aromatic vinyl-cyano vinyl-based copolymer and an acrylic resin, and thus is suitable for an automotive exterior material.

9 Claims, No Drawings

THERMOPLASTIC RESIN COMPOSITION WITH IMPROVED HEAT RESISTANCE AND COLORING PROPERTY

TECHNICAL FIELD

The present invention relates to a thermoplastic resin composition, and more particularly, to an acrylic thermoplastic resin composition suitable for an automotive exterior material.

BACKGROUND ART

An acrylonitrile-butadiene-styrene resin (hereinafter, "ABS resin") is a resin which is widely used in electric/electronic products, automobile components, and general goods due to excellent impact resistance, mechanical strength, surface properties, and processability.

However, since an ABS resin contains chemically unstable double bonds in a rubber component of the resin, the rubber component is likely to be aged by UV light. Such an ABS resin can suffer from relatively severe discoloration and deterioration in properties over time when left outdoors due to poor weatherability and light resistance and thus is unsuitable for outdoor use. In order to solve this problem, there has been proposed a method in which a molded article produced using the ABS resin is subjected to post-processing such as painting and plating, or a large amount of UV stabilizer is added when the ABS resin is subjected to extrusion. However, the former has shortcomings of complex processes and high defect rate, and the latter has problems of increased manufacturing costs and poor long-term weatherability.

In order to overcome such a problem of the ABS resin, various resins known to have good weatherability are used instead of the ABS resin. Particularly, an acrylate-styrene-acrylonitrile resin (hereinafter, "ASA resin") is most widely used. Such an ASA resin has good properties in terms of weatherability, light resistance, chemical resistance, and heat resistance and thus is suitable for outdoor exterior materials that are exposed to sunlight for a long time, such as a material for outdoor electric/electronic products, an automotive exterior material, and a construction material.

Particularly, the ASA resin used as an automotive exterior material requires excellent colorability and heat resistance to provide a beautiful appearance with a black-based color.

Conventionally, an α-methyl styrene-based matrix SAN resin is generally used to improve heat resistance of the ASA resin. However, despite having good heat resistance, a copolymer of a vinyl cyanide compound and an α-methyl styrene compound used to provide heat resistance has high gas emissions causing deterioration in injection stability and problems in terms of appearance, such as deterioration in gloss, and can cause reduction in colorability, since the original color thereof is yellow.

In order to solve this problem, a method for improving colorability of a base resin by adjusting particle diameter of g-ABS or for improving colorability by adding an additive for facilitating dispersion of a pigment has been studied.

However, such a method of adjusting properties of a base resin has a limitation in improving colorability to a desired level and has a problem of reduction in heat resistance.

Korean Patent Publication No. 10-2013-0075812 (Patent Document 1) discloses an ASA resin composition which includes an acrylic graft copolymer, two vinyl cyanide-aromatic vinyl copolymers having different molecular weights, and an α-methyl styrene-based terpolymer and thus exhibits excellent properties in terms of impact strength, weatherability, and discoloration resistance at high temperature. However, such an ASA resin composition exhibits poor pigment-colorability and insufficient heat resistance.

PRIOR LITERATURE

Patent Document (Patent Document 1) Korean Patent Laid-open Publication No. 10-2013-0075812 (published on Jul. 23, 2013)

DISCLOSURE

Technical Problem

The present invention has been conceived to solve such a problem in the art and it is an aspect of the present invention to provide a thermoplastic resin composition which exhibits improved colorability and heat resistance. More specifically, the present invention is aimed at providing a thermoplastic resin composition that includes an acrylic graft copolymer, an aromatic vinyl-vinyl cyanide copolymer, and an acrylic resin, thereby exhibiting improved properties in terms of both colorability and heat resistance.

It is another aspect of the present invention to provide a molded article which is manufactured using the thermoplastic resin composition as set forth above and exhibits excellent properties in terms of colorability and heat resistance.

Technical Solution

In accordance with one aspect of the present invention, there is provided a thermoplastic resin composition, including: (A) an acrylic graft copolymer; (B) an aromatic vinyl-vinyl cyanide copolymer; and (C) an acrylic resin, wherein the acrylic resin (C) has a glass transition temperature (Tg) of 110° C. or higher.

In one embodiment, the thermoplastic resin composition may include: 20 wt % to 60 wt % of the acrylic graft copolymer (A); 35 wt % to 75 wt % of the aromatic vinyl-vinyl cyanide copolymer (B), and 5 wt % to 30 wt % of the acrylic resin (C).

In one embodiment, the acrylic resin (C) may have a glass transition temperature (Tg) of 110° C. to 120° C.

In one embodiment, the acrylic graft copolymer (A) may be an acrylonitrile-styrene-acrylate graft copolymer (g-ASA) obtained by graft-polymerizing 40 wt % to 60 wt % of a mixture of an aromatic vinyl compound and a vinyl cyanide compound with 40 wt % to 60 wt % of an acrylic rubber polymer.

In one embodiment, the aromatic vinyl-vinyl cyanide copolymer (B) may be selected from among a copolymer of styrene and acrylonitrile, a copolymer of α-methyl styrene and acrylonitrile, and a copolymer of styrene, α-methyl styrene, and acrylonitrile.

In one embodiment, the acrylic resin (C) may be obtained by polymerizing at least one (meth)acrylate type monomer selected from among methyl acrylate, ethyl acrylate, butyl acrylate, 2-ethylbutyl acrylate, 2-ethylhexyl (meth) acrylate, hexyl acrylate, heptyl acrylate, octyl acrylate, n-pentyl acrylate, vinyl acrylate, lauryl acrylate, methyl methacrylate, ethyl methacrylate, butyl methacrylate, 2-ethylbutyl methacrylate, 2-ethylhexyl methacrylate, and lauryl methacrylate.

In one embodiment, the acrylic resin (C) may be poly (methyl methacrylate) (PMMA).

In one embodiment, the thermoplastic resin composition may further include an additive selected form the group consisting of antimicrobial agents, heat stabilizers, antioxidants, release agents, photostabilizers, inorganic additives, surfactants, coupling agents, plasticizers, compatibilizers, lubricants, antistatic agents, colorants, pigments, dyes, flame retardants, flame retardant aids, anti-dripping agents, weathering agents, UV absorbers, UV blocking agents, and a mixture thereof.

In accordance with another aspect of the present invention, there is provided a molded article produced using the thermoplastic resin composition as set forth above.

In one embodiment, the molded article may satisfy Equations 1 and 2:

$$98.0 \leq VST \quad \text{[Equation 1]}$$

$$L < 29.0 \quad \text{[Equation 2]}$$

(in Equation 1, VST denotes a Vicat softening temperature (° C.), as measured in accordance with ISO R306, and, in Equation 2, L denotes blackness (L), as measured using a spectrocolorimeter).

In one embodiment, the molded article may be an automotive exterior material.

Advantageous Effects

According to the present invention, it is possible to provide a thermoplastic resin composition which includes an acrylic resin having high glass transition temperature in an appropriate amount, thereby exhibiting improved properties in terms of both colorability and heat resistance.

Thus, the thermoplastic resin composition according to the present invention is suitable for use as an automotive exterior material requiring uniform colorability and excellent mechanical properties and heat resistance at the same time.

BEST MODE

Hereinafter, embodiments of the present invention will be described in detail. It should be understood that the following embodiments are provided for complete disclosure and thorough understanding of the invention by those skilled in the art. In addition, unless otherwise stated, technical and scientific terms as used herein have a meaning generally understood by those skilled in the art. Descriptions of known functions and constructions which may unnecessarily obscure the subject matter of the present invention will be omitted.

As used herein, unless otherwise stated, the term "(meth) acrylate" may refer to "acrylate" and/or "methacrylate".

The present inventors have conducted research to develop a thermoplastic resin composition which exhibits excellent properties in terms of colorability and heat resistance, and, from results of the research, have found that a thermoplastic resin composition including an acrylic graft copolymer, an aromatic vinyl-vinyl cyanide copolymer, and an acrylic resin having high glass transition can secure heat resistance without deterioration in mechanical properties while exhibiting improved colorability, and thus have completed the present invention.

A thermoplastic resin composition according to the present invention may include (A) an acrylic graft copolymer, (B) an aromatic vinyl-vinyl cyanide copolymer, and (C) an acrylic resin.

Now, each component of the thermoplastic resin composition according to the present invention will be described in more detail.

(A) Acrylic Graft Copolymer

An acrylic graft copolymer according to one embodiment of the present invention can improve impact strength and colorability in combination with other components of the composition.

The acrylic graft copolymer may be a core-shell type copolymer composed of a core of an acrylic rubber polymer and a shell of an aromatic vinyl compound and a vinyl cyanide compound. The acrylic graft copolymer may be prepared through graft polymerization of a mixture including the acrylic rubber polymer, the aromatic vinyl compound, and the vinyl cyanide compound. Here, polymerization may be performed by any typical polymerization method known in the art, such as mass polymerization, suspension polymerization, and emulsion polymerization.

For example, the acrylic graft copolymer may be prepared by graft-polymerizing 40 wt % to 60 wt % of a mixture of the aromatic vinyl compound and the vinyl cyanide compound in the presence of 40 wt % to 60 wt % of the acrylic rubber polymer through emulsion polymerization.

Here, the acrylic rubber polymer may be an alkyl acrylate rubber or a copolymer of an alkyl acrylate rubber and an aromatic vinyl compound. More specifically, the acrylic rubber polymer may be a $C_2$ to $C_{10}$ alkyl acrylate or a copolymer of a $C_2$ to $C_{10}$ alkyl acrylate and a styrene monomer.

The acrylic rubber polymer may have an average particle diameter of 0.1 μm to 0.5 μm. Preferably, the acrylic rubber polymer has an average particle diameter of 0.1 μm to 0.3 μm.

If the average particle diameter is less than 0.1 μm, the resin composition can have reduced impact strength, whereas, if the average particle diameter exceeds 0.5 μm, the resin composition can have poor colorability.

For example, the mixture of the vinyl cyanide compound and the aromatic vinyl compound copolymerized with the acrylic rubber polymer may be a mixture of 20 wt % to 30 wt % of a vinyl cyanide compound and 70 wt % to 80 wt % of an aromatic vinyl compound.

The vinyl cyanide compound may include acrylonitrile, methacrylonitrile, and fumaronitrile, and these compounds may be used alone or as a mixture thereof. Particularly, the vinyl cyanide compound may be acrylonitrile.

The aromatic vinyl compound may include at least one selected from among styrene, $C_1$ to $C_{10}$ alkyl-substituted styrene, halogen-substituted styrene, vinyl toluene, vinyl naphthalene, and a combination thereof.

The acrylic graft copolymer according to the present invention may be present in an amount of 20 wt % to 60 wt % in the thermoplastic resin composition. Preferably, the acrylic graft copolymer is present in an amount of 20 wt % to 60 wt % in the thermoplastic resin composition. If the amount of the acrylic graft copolymer is less than 20 wt %, the resin composition can have poor weatherability, whereas, if the amount of the acrylic graft copolymer exceeds 60 wt %, the resin composition can have poor moldability and colorability.

(B) Aromatic Vinyl-Vinyl Cyanide Copolymer

An aromatic vinyl-vinyl cyanide copolymer according to one embodiment of the present invention serves to improve impact strength and moldability in combination with other components of the composition and may be a copolymer of an aromatic vinyl compound and a vinyl cyanide compound.

A weight ratio of the aromatic vinyl compound to the vinyl cyanide compound may range from 70:30 to 90:10. More preferably, a weight ratio of the aromatic vinyl compound to the vinyl cyanide compound ranges from 75:25 to 85:15. Within this range, the resin composition can exhibit improved impact strength and flowability.

The aromatic vinyl compound may include at least one selected from among styrene, $C_1$ to $C_{10}$ alkyl-substituted styrene, halogen-substituted styrene, vinyl toluene, vinyl naphthalene, and a combination thereof.

Examples of the alkyl-substituted styrene may include α-methylstyrene, p-methylstyrene, o-ethylstyrene, m-ethylstyrene, p-ethylstyrene, p-t-butylstyrene, and 2,4-dimethylstyrene.

The vinyl cyanide compound may include at least one of acrylonitrile, methacrylonitrile, ethacrylonitrile, phenylacrylonitrile, fumaronitrile, and a combination thereof.

Examples of the aromatic vinyl-vinyl cyanide copolymer may include a copolymer of styrene and acrylonitrile; a copolymer of α-methylstyrene and acrylonitrile; and a copolymer of styrene, α-methylstyrene, and acrylonitrile. Preferably, the aromatic vinyl-vinyl cyanide copolymer may be a styrene-acrylonitrile copolymer.

In addition, the aromatic vinyl-vinyl cyanide copolymer according to the present invention may optionally further include an ethylenically unsaturated monomer. When the aromatic vinyl-vinyl cyanide copolymer includes an ethylenically unsaturated monomer, the resin composition can exhibit improved properties in terms of processability and heat resistance.

The ethylenically unsaturated monomer may include: aromatic esters of acrylic acid or methacrylic acid, such as methyl methacrylate, $C_1$ to $C_4$ alkyl methacrylate, phenyl acrylate, phenyl methacrylate, benzyl acrylate, benzyl methacrylate, 2-phenylethyl acrylate, 2-phenylethyl methacrylate, 2-phenoxyethyl acrylate, and 2-phenoxyethyl methacrylate; N-substituted maleimides such as N-methyl maleimide, N-phenyl maleimide, and N-cyclohexyl maleimide; maleic acid, fumaric acid, itaconic acid and anhydrides thereof; and nitrogen functional monomers such as acrylic acid, methacrylic acid, dicarboxylic acid, dimethylamino ethyl acrylate, diethylamino ethyl acrylate, vinyl imidazole, vinyl pyrrolidone, vinyl caprolactam, vinyl carbazole, vinyl aniline, acrylamide, and methacrylamide, without being limited thereto.

The aromatic vinyl-vinyl cyanide copolymer according to one embodiment of the present invention may have a weight average molecular weight of 80,000 g/mol to 200,000 g/mol. More preferably, the aromatic vinyl-vinyl cyanide copolymer has a weight average molecular weight of 90,000 g/mol to 150,000 g/mol. Within this range, the resin composition can exhibit excellent properties in terms of balance between impact strength and processability.

The aromatic vinyl-vinyl cyanide copolymer according to one embodiment of the present invention may be a mixture of 40 wt % to 60 wt % of a first aromatic vinyl-vinyl cyanide copolymer (B-1) and a 40 wt % to 60 wt % of a second aromatic vinyl-vinyl cyanide copolymer (B-2).

The first aromatic vinyl-vinyl cyanide copolymer (B-1) may have a weight average molecular weight of 100,000 g/mol to 180,000 g/mol, and the second aromatic vinyl-vinyl cyanide copolymer (B-2) may have a weight average molecular weight of 50,000 g/mol to 90,000 g/mol.

When the two aromatic vinyl-vinyl cyanide copolymers having different weight average molecular weights are present in amounts set forth above, the resin composition can be easily adjusted in viscosity and thus can exhibit excellent properties in terms of balance between impact strength and processability.

The aromatic vinyl-vinyl cyanide copolymer according to the present invention may be present in an amount of 35 wt % to 75 wt % in the thermoplastic resin composition. Preferably, the aromatic vinyl-vinyl cyanide copolymer is present in an amount of 45 wt % to 65 wt % in the thermoplastic resin composition. If the amount of the aromatic vinyl-vinyl cyanide copolymer is less than 35 wt %, a relative excess of a rubbery compound can cause deterioration in flowability and thus deterioration in moldability and colorability of the resin composition. If the amount of the aromatic vinyl-vinyl cyanide copolymer exceeds 75 wt %, the resin composition can suffer deterioration in mechanical properties such as impact strength.

(C) Acrylic Resin

An acrylic resin according to one embodiment of the present invention exhibits partial compatibility with the aromatic vinyl-vinyl cyanide copolymer and thus can improve chemical resistance of the resin composition.

In addition, the acrylic resin according to the present invention has a glass transition temperature (Tg) of 110° C. or higher and thus can improve heat resistance of the resin composition. Preferably, the acrylic resin has a glass transition temperature of 110° C. to 120° C. More preferably, the acrylic resin may have a glass transition temperature of 114° C. to 116° C.

Within this range, the acrylic resin can improve flowability of the resin composition and can exhibit excellent compatibility with other components while reducing stress during processing, thereby improving heat resistance and colorability of the resin composition.

The acrylic resin according to the present invention may have a weight average molecular weight of 50,000 g/mol to 300,000 g/mol. More specifically, the acrylic resin according to the present invention may have a weight average molecular weight of 70,000 g/mol to 180,000 g/mol. Within this range, the acrylic resin can have excellent compatibility with the aromatic vinyl-vinyl cyanide copolymer, thereby effectively improving impact strength and chemical resistance of the resin composition. Further, the acrylic resin can increase flowability of the resin composition while providing excellent moldability.

The acrylic resin according to the present invention may be a polymer including 60 wt % to 99 wt % of a $C_1$ to $C_{14}$ alkyl group-containing (meth)acrylate type monomer.

When the amount of the (meth)acrylate type monomer satisfies the above range, the resin composition can exhibit improved impact resistance and moldability. If the amount of the (meth)acrylate type monomer is less than 60 wt %, the acrylic resin can be decomposed at high temperature, whereas, if the amount of the (meth)acrylate type monomer exceeds 99 wt %, the resin composition can suffer from deterioration in flowability and impact resistance.

The acrylic resin may be a polymer including at least one (meth)acrylate type monomer selected from among methyl acrylate, ethyl acrylate, butyl acrylate, 2-ethylbutyl acrylate, 2-ethylhexyl (meth)acrylate, hexyl acrylate, heptyl acrylate, octyl acrylate, n-pentyl acrylate, vinyl acrylate, lauryl acrylate, methyl methacrylate, ethyl methacrylate, butyl methacrylate, 2-ethylbutyl methacrylate, 2-ethylhexyl methacrylate, and lauryl methacrylate.

More specifically, the acrylic resin is poly(methyl methacrylate) (PMMA).

The acrylic resin according to the present invention may be prepared by polymerizing the monomers as set forth above in the presence of a solvent and a polymerization initiator through mass polymerization, suspension polymerization, or emulsion polymerization, without being limited thereto. Here, the solvent may include ethers such as methanol, tetrahydrofuran, ethylene glycol monomethyl ether, ethylene glycol monoethyl ether, propylene glycol monomethyl ether acetate, methylcellosolve acetate, ethylcellosolve acetate, diethylene glycol monomethyl ether, and diethylene glycol monoethyl ether or combinations thereof. The polymerization initiator may include 2,2'-azobisisobutyronitrile, 2,2'-azobis(2,4-dimethylvaleronitrile), 2,2'-azobis(4-methoxy-2,4-dimethylvaleronitrile), and the like.

The acrylic resin according to the present invention may be present in an amount of 5 wt % to 30 wt % based on the total weight of the thermoplastic resin composition. More preferably, the acrylic resin is present in an amount of 10 wt % to 25 wt % in the thermoplastic resin composition. Within this range, the resin composition can exhibit excellent balance between flowability, impact strength, and scratch resistance while exhibiting improved heat resistance and colorability.

If the amount of the acrylic resin is less than 5 wt %, the acrylic resin cannot provide a synergistic effect through combination with other components, whereas, if the amount of the acrylic resin exceeds 30 wt %, the resin composition can suffer from deterioration in impact resistance.

In addition, the thermoplastic resin composition according to the present invention may further include carbon black to improve colorability. The carbon black may include any carbon black product well known in the art and may include, for example, at least one selected from the group consisting of Ketjen black, acetylene black, furnace black, channel black, and a combination thereof.

The carbon black according to the present invention may be used alone, or may be used in the form of a master batch obtained by mixing the carbon black with the aromatic vinyl-vinyl cyanide copolymer.

When the carbon black is used in the form of a master batch, the aromatic vinyl-vinyl cyanide copolymer may be included in an amount of 30 wt % to 70 wt %, and the carbon black may be included in an amount of 30 wt % to 70 wt % in the master batch. Specifically, the aromatic vinyl-vinyl cyanide copolymer may be included in an amount of 50 wt % to 70 wt %, and the carbon black may be included in an amount of 30 wt % to 50 wt % in the master batch.

When the master batch includes the aromatic vinyl-vinyl cyanide copolymer and the carbon black in amounts set forth above, the carbon black and a colorant can exhibit excellent dispersion in the thermoplastic resin composition, thereby improving moldability of the resin composition while further improving colorability of the resin composition.

The carbon black according to one embodiment of the present invention may be present in an amount of 1 part by weight to 5 parts by weight based on 100 parts by weights of the thermoplastic resin composition. Preferably, the carbon black is present in an amount of 1 part by weight to 3 parts by weight based on 100 parts by weights of the thermoplastic resin composition. If the amount of the carbon black is less than 1 part by weight, there is a problem in terms of blackness, whereas, if the amount of the carbon black exceeds 5 parts by weight, the resin composition can suffer from deterioration in impact strength.

In addition to the above components, the thermoplastic resin composition according to the present invention may further include an additive, as needed. The additive may include additives selected from the group consisting of antimicrobial agents, heat stabilizers, antioxidants, release agents, photostabilizers, inorganic additives, surfactants, coupling agents, plasticizers, compatibilizers, lubricants, antistatic agents, colorants, pigments, dyes, flame retardants, flame retardant aids, anti-dripping agents, weathering agents, UV absorbers, UV blocking agents, and a mixture thereof.

The additive may be included in an appropriate amount without altering properties of the thermoplastic resin composition. Specifically, the additive may be included in an amount of 20 parts by weight or less, more specifically from 0.1 parts by weight to 15 parts by weight based on 100 parts by weight of the thermoplastic resin composition.

The thermoplastic resin composition according to the present invention may be prepared by any suitable method known in the art. For example, the aforementioned components and, optionally, the additives, are mixed using a Henschel mixer, a V blender, a tumbler blender, or a ribbon blender, followed by melt extrusion in a single-screw extruder or a twin-screw extruder at 150° C. to 300° C., thereby preparing a thermoplastic resin composition in pellet form. More specifically, the above mixture may be subjected to melt extrusion in a twin-screw extruder (L/D=29, Φ=45 mm) at 180° C. to 280° C., at a screw revolution speed of 300 rpm to 600 rpm and at a self-feeding rate of 60 kg/hr to 600 kg/hr, thereby preparing a thermoplastic resin composition in pellet form.

In accordance with another aspect of the present invention, there is provided a molded article produced using the thermoplastic resin composition as set forth above. That is, the thermoplastic resin composition may be produced into a molded article by various molding methods such as injection molding, double-injection molding, blow molding, extrusion, thermal molding, and the like.

The molded article according to the present invention can satisfy Equations 1 and 2:

$$98.0 \leq VST \qquad \text{<Equation 1>}$$

$$L < 29.0 \qquad \text{<Equation 2>}$$

(in Equation 1, VST denotes a Vicat softening temperature (° C.), as measured in accordance with ISO R306, and, in Equation 2, L denotes blackness (L), as measured using a spectrocolorimeter).

As described above, the molded article according to the present invention includes the acrylic resin having high glass transition temperature and thus can exhibit improved heat resistance and colorability without deterioration in mechanical properties. Thus, the molded article may be used as an automotive exterior material requiring such properties.

Next, the present invention will be described in more detail with reference to examples. However, it should be noted that these examples are provided for illustration only and should not be construed in any way as limiting the invention.

Property Evaluation

1) Vicat Softening Temperature (VST) (Unit: ° C.)

Vicat softening temperature was measured under a load of 50 N in accordance with ISO R306.

2) Blackness (L)

An L value of a specimen was measured using a colorimeter (CM-2500C, Minolta Co., Ltd.)

Details of components used in the following Examples and Comparative Examples are as follows:

(A-1) Acrylic Graft Copolymer

A core-shell type g-ASA resin (Cheil Industries Inc.) obtained by grafting 33.5 wt % of styrene and 16.5 wt % of acrylonitrile to an acrylic rubber polymer, prepared through copolymerization of 42.5 wt % of butyl acrylate having an average particle diameter of 0.18 μm and 7.5 wt % of styrene, through emulsion polymerization.

(A-2) Acrylic Graft Copolymer

A core-shell type g-ASA resin (Cheil Industries Inc.) obtained by grafting 26.8 wt % of styrene and 13.2 wt % of acrylonitrile to 60 wt % of butyl acrylate having an average particle diameter of 0.32 μm through emulsion polymerization.

(B-1) First Aromatic Vinyl-Vinyl Cyanide Copolymer

A styrene-acrylonitrile copolymer (SAN) resin (Cheil Industries Inc.) obtained by copolymerization of 32 wt % of acrylonitrile with 68 wt % of styrene and having a weight average molecular weight of 120,000 g/mol.

(B-2) Second Aromatic Vinyl-Vinyl Cyanide Copolymer

A styrene-acrylonitrile copolymer (SAN) resin (Cheil Industries Inc.) obtained by copolymerization of 34 wt % of acrylonitrile with 66 wt % of styrene and having a weight average molecular weight of 85,000 g/mol.

(C-1) Acrylic Resin

Polymethyl methacrylate (PMMA, Cheil Industries Inc.) having a glass transition temperature (Tg) of 115° C.

(C-2) Acrylic Resin

Polymethyl methacrylate (PMMA) (TF-VH, Daesan MMA Corp.) having a glass transition temperature (Tg) of 116° C.

(C-3) Acrylic Resin

Polymethyl methacrylate (PMMA) (L-87, LG CHEM. Ltd.) having a glass transition temperature (Tg) of 103° C.

(D) Methyl Methacrylate-Styrene-Acrylonitrile Copolymer

A methyl methacrylate-styrene-acrylonitrile copolymer (M-SAN) (Cheil Industries Inc.) obtained by copolymerizing 15 wt % of methyl methacrylate with 20 wt % of acrylonitrile and 65 wt % of styrene.

(E) Carbon Black Master Batch

A carbon black master batch (MB 5093, MUIL CHEMICAL Co., Ltd.) having a carbon black content of 45 wt %.

Example 1

As shown in Table 1, 2.5 parts by weight of the (E) carbon black master batch, 0.4 parts by weight of an internal lubricant (Lubricant(S); HI-LUB B-50), and 1.3 parts by weight of a weathering stabilizer (UV stabilizer; LIGHT STABILITYA, UV-327-1) were mixed with 100 parts by weight of a base resin including 24 wt % of the (A-1) acrylic graft copolymer, 16 wt % of the (A-2) acrylic graft copolymer, 25 wt % of the (B-1) first aromatic vinyl-vinyl cyanide copolymer, 25 wt % of the (B-2) second aromatic vinyl-vinyl cyanide copolymer, and 10 wt % of the (C-1) acrylic resin, thereby preparing a thermoplastic resin.

The prepared thermoplastic resin was stirred using a typical mixer, followed by extrusion in a twin-screw extruder (L/D=29, Φ=45 mm), thereby preparing pellets. The prepared pellets were dried using a dehumidifying dryer at 80° C. for 2 hours, followed by injection molding using a 60 oz. injection machine at a cylinder temperature of 250° C. and at a mold temperature of 60° C., thereby preparing a specimen for property evaluation having a size of 9 cm×5 cm×0.2 cm. The prepared specimen was evaluated as to the following properties, and results are shown in Table 2.

Example 2

A specimen for property evaluation was prepared in the same manner as in Example 1 except that the (C-2) acrylic resin having a glass transition temperature of 116° C. was used instead of the (C-1) acrylic resin, as shown in Table 1. The prepared specimen was evaluated as to the following properties, and results are shown in Table 2.

Example 3

A specimen for property evaluation was prepared in the same manner as in Example 1 except that the (C-1) acrylic resin was used in an amount of 20 parts by weight, as shown in Table 1. The prepared specimen was evaluated as to the following properties, and results are shown in Table 2.

Example 4

A specimen for property evaluation was prepared in the same manner as in Example 2 except that the (C-2) acrylic resin was used in an amount of 20 parts by weight, as shown in Table 1. The prepared specimen was evaluated as to the following properties, and results are shown in Table 2.

Comparative Example 1

A specimen for property evaluation was prepared in the same manner as in Example 1 except that 100 parts by weight of a base resin including 24 wt % of the (A-1) acrylic graft copolymer, 16 wt % of the (A-2) acrylic graft copolymer, 30 wt % of the (B-1) first aromatic vinyl-vinyl cyanide copolymer, and 30 wt % of the (B-2) aromatic vinyl-vinyl cyanide copolymer, without including the acrylic resin (C) having a glass transition temperature of 110° C. or higher was used, as shown in Table 1. The prepared specimen was evaluated as to the following properties, and results are shown in Table 2.

Comparative Example 2

A specimen for property evaluation was prepared in the same manner as in Example 1 except that the (C-3) acrylic resin having a glass transition temperature of 103° C. was used instead of the (C-1) acrylic resin, as shown in Table 1. The prepared specimen was evaluated as to the following properties, and results are shown in Table 2.

Comparative Example 3

A specimen for property evaluation was prepared in the same manner as in Example 1 except that the (D) methyl methacrylate-styrene-acrylonitrile copolymer was used instead of the (C-1) acrylic resin, as shown in Table 1. The prepared specimen was evaluated as to the following properties, and results are shown in Table 2.

Comparative Example 4

A thermoplastic resin was prepared in the same manner as in Example 1 except that the amounts of the (B-1) first aromatic vinyl-vinyl cyanide, the (B-2) second aromatic vinyl-vinyl cyanide copolymer, and the (C-1)acrylic resin were changed to 10 wt %, 10 wt %, and 40 wt %, respectively, as shown in Table 1. However, the thermoplastic resin could not be produced into pellets due to poor extrusion processability.

TABLE 1

|   | Example | | | | Comparative Example | | | |
|---|---|---|---|---|---|---|---|---|
|   | 1 | 2 | 3 | 4 | 1 | 2 | 3 | 4 |
| A-1 | 24 | 24 | 24 | 24 | 24 | 24 | 24 | 24 |
| A-2 | 16 | 16 | 16 | 16 | 16 | 16 | 16 | 16 |
| B-1 | 25 | 25 | 20 | 20 | 30 | 25 | 25 | 10 |
| B-2 | 25 | 25 | 20 | 20 | 30 | 25 | 25 | 10 |
| C-1 | 10 | — | 20 | — | — | — | — | 40 |
| C-2 | — | 10 | — | 20 | — | — | — | — |
| C-3 | — | — | — | — | — | 10 | — | — |
| D | — | — | — | — | — | — | 10 | — |
| E | 2.5 | 2.5 | 2.5 | 2.5 | 2.5 | 2.5 | 2.5 | 2.5 |

TABLE 2

|   | Example | | | | Comparative Example | | | |
|---|---|---|---|---|---|---|---|---|
|   | 1 | 2 | 3 | 4 | 1 | 2 | 3 | 4 |
| VST (° C.) | 98.4 | 98.7 | 99.6 | 99.9 | 97.6 | 98.1 | 97.8 | X (unmeasurable) |
| Colorability (L) | 28.83 | 28.97 | 28.23 | 28.29 | 29.45 | 28.86 | 29.21 | X (unmeasurable) |

As shown in Table 2, it can be seen that Examples 1 to 4 according to the present invention exhibited excellent properties in terms of heat resistance, colorability, and impact strength, as compared with Comparative Examples.

Thus, it can be seen that when the thermoplastic resin composition included the acrylic resin having a glass transition temperature of 110° C. or higher in an optimal amount, the thermoplastic resin composition exhibited improved heat resistance without deterioration in mechanical properties such as moldability and impact strength, and had a reduced L value, thereby exhibiting improved colorability.

Conversely, it can be seen that Comparative Example 1 not using the acrylic resin having a glass transition temperature of 110° C. or higher and Comparative Example 2 using the acrylic resin having a glass transition temperature of less than 110° C. exhibited poor properties in terms of heat resistance and colorability, as compared with Examples.

In addition, it can be seen that Comparative Example 3 using the M-SAN resin to improve heat resistance and colorability was similar to Comparative Example 1 in terms of heat resistance and colorability.

Further, it can be seen that Comparative Example 4 using an excess of the acrylic resin having a glass transition temperature of 110° C. or higher exhibited poor moldability, making extrusion impossible.

Therefore, it was confirmed that the thermoplastic resin composition according to embodiments of the present invention had good moldability while exhibiting improved properties in terms of heat resistance and colorability.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention.

Therefore, the scope of the present invention should be defined by the appended claims and equivalents thereof.

The invention claimed is:

1. A thermoplastic resin composition consisting essentially of:
   (A) an acrylic graft copolymer;
   (B) an aromatic vinyl-vinyl cyanide copolymer;
   (C) an acrylic resin;
   (D) carbon black; and
   optionally an additive selected from the group consisting of antimicrobial agents, heat stabilizers, antioxidants, release agents, photostabilizers, inorganic additives, surfactants, coupling agents, plasticizers, compatibilizers, lubricants, antistatic agents, colorants, pigments, dyes, flame retardants, flame retardant aids, anti-dripping agents, weathering agents, UV absorbers, UV blocking agents, and mixtures thereof,
   wherein the acrylic resin (C) has a glass transition temperature (Tg) of 110° C. or higher, and
   wherein a molded article produced using the thermoplastic resin composition satisfies Equations 1 and 2:

$$98.0 \leq VST \quad \text{[Equation 1]}$$

$$L < 29.0 \quad \text{[Equation 2]}$$

wherein in Equation 1, VST denotes a Vicat softening temperature (° C.), as measured in accordance with ISO R306, and, in Equation 2, L denotes blackness (L), as measured using a spectrocolorimeter.

2. The thermoplastic resin composition according to claim 1, consisting essentially of:
   a base resin of 20 wt % to 60 wt % of the acrylic graft copolymer (A); 35 wt % to 75 wt % of the aromatic vinyl-vinyl cyanide copolymer (B); and 5 wt % to 30 wt % of the acrylic resin (C); and
   1 to 5 parts by weight of the carbon black (D) based on 100 parts by weight of the base resin of (A), (B), and (C).

3. The thermoplastic resin composition according to claim 1, wherein the acrylic resin (C) has a glass transition temperature (Tg) of 110° C. to 120° C.

4. The thermoplastic resin composition according to claim 1, wherein the acrylic graft copolymer (A) is an acrylonitrile-styrene-acrylate graft copolymer (g-ASA) obtained by graft-polymerizing 40 wt % to 60 wt % of a mixture of an aromatic vinyl compound and a vinyl cyanide compound with 40 wt % to 60 wt % of an acrylic rubber polymer.

5. The thermoplastic resin composition according to claim 1, wherein the aromatic vinyl-vinyl cyanide copolymer (B) is a copolymer selected from the group consisting of a copolymer of styrene and acrylonitrile, a copolymer of α-methyl styrene and acrylonitrile, and a copolymer of styrene, α-methyl styrene, and acrylonitrile.

6. The thermoplastic resin composition according to claim 1, wherein the acrylic resin (C) is obtained by polymerizing at least one (meth)acrylate type monomer selected from the group consisting of methyl acrylate, ethyl acrylate, butyl acrylate, 2-ethylbutyl acrylate, 2-ethylhexyl (meth) acrylate, hexyl acrylate, heptyl acrylate, octyl acrylate, n-pentyl acrylate, vinyl acrylate, lauryl acrylate, methyl methacrylate, ethyl methacrylate, butyl methacrylate, 2-ethylbutyl methacrylate, 2-ethylhexyl methacrylate, and lauryl methacrylate.

7. The thermoplastic resin composition according to claim 1, wherein the acrylic resin (C) is poly(methyl methacrylate) (PMMA).

8. A molded article produced using the thermoplastic resin composition according claim 1.

9. The molded article according to claim 8, wherein the molded article is an automotive exterior material.

* * * * *